United States Patent [19]

Von Au et al.

[11] Patent Number: 5,443,627
[45] Date of Patent: Aug. 22, 1995

[54] ORGANOPOLYSILOXANE-ALKYLTRIALKOXYSILANE EMULSIONS FOR IMPREGNATING STRUCTURAL FIBRE-REINFORCED CEMENT COMPONENTS

[75] Inventors: Günter Von Au; Dieter Gerhardinger, both of Burghausen, Germany

[73] Assignee: Wacker-Chemie GmbH, Munich, Germany

[21] Appl. No.: 107,786

[22] PCT Filed: Apr. 30, 1992

[86] PCT No.: PCT/EP92/00948
§ 371 Date: Aug. 20, 1993
§ 102(e) Date: Aug. 20, 1993

[87] PCT Pub. No.: WO92/19671
PCT Pub. Date: Nov. 12, 1993

[30] Foreign Application Priority Data

May 3, 1991 [DE] Germany ............... 41 14 498.8

[51] Int. Cl.$^6$ .................. C04B 24/42; C04B 41/64
[52] U.S. Cl. ........................ 106/2; 106/724; 106/287.14; 106/287.16; 427/387; 427/393.6
[58] Field of Search .............. 106/2, 287.14, 287.16, 106/724; 427/387, 393.6

[56] References Cited

U.S. PATENT DOCUMENTS

| | | | |
|---|---|---|---|
| 3,623,895 | 11/1971 | Nitzsche et al. | 106/724 |
| 4,486,476 | 12/1984 | Fritsch et al. | 427/387 |
| 4,877,654 | 10/1989 | Wilson | 106/2 |
| 5,039,724 | 8/1991 | Demlehner et al. | 524/287 |
| 5,091,002 | 2/1992 | Schamberg et al. | 106/2 |

Primary Examiner—Karl Group
Assistant Examiner—C. M. Bonner
Attorney, Agent, or Firm—Martin Connaughton

[57] ABSTRACT

The invention concerns aqueous emulsions of (A) organopolysiloxane free from basic nitrogen and (B) alkyltrialkoxysilane which contain (C) an emulsifier and (D) water. Organopolysiloxane (A) has formula $R_aSi(OR^1)_bO_{4-a-b/2}$, wherein R has identical or different, monovalent, optionally substituted $C_1$–$C_{18}$ hydrocarbon residues bonded by SiC, $R^1$ has identical or different, monovalent, optionally substituted $C_1$–$C_6$ hydrocarbon residues, a is equal to 0, 1, 2 or 3, on average 0.75 to 1.5, and b is equal to 1, 2 or 3, on average 0.2 to 2.0, and has a molecular weight of at least 600 g/mol. Also disclosed are a method for preparing said emulsions and their use for water-repellent impregnation of cement-bonded fibrous building components.

2 Claims, No Drawings

ORGANOPOLYSILOXANE-ALKYLTRIALKOXYSILANE EMULSIONS FOR IMPREGNATING STRUCTURAL FIBRE-REINFORCED CEMENT COMPONENTS

The present invention relates to aqueous emulsions of alkoxy-containing nitrogen-free organopolysiloxane and alkyltrialkoxysilane.

Aqueous emulsions of alkyltrialkoxysilanes, alkoxy-containing organopolysiloxanes with or without basic nitrogen are known from U.S. Pat. No 4,661,551 (issued 28 Apr. 1987, H. Mayer et al., Wacker-Chemie GmbH). These emulsions are highly suitable for imparting water repellency on building materials, including concrete and structural fibre-reinforced cement components. However, the building materials treated therewith yellow under the influence of light and air.

Aqueous emulsions of alkyltrialkoxysilanes for imparting water repellency on building materials are known inter alia from U.S. Pat. No. 4,877,654 (issued 31 Oct. 1989, M. E. Wilson, PCR Inc.). However, the alkyltrialkoxysilanes are relatively expensive.

The use of less costly emulsions of alkoxy-containing organopolysiloxanes for imparting water repellency on building materials is described in U.S. Pat. No. 4,704,416 (issued 3 May 1988, H. Eck and M. Roth, Wacker-Chemie GmbH). However, the water repellency imparting by such organopolysiloxanes is unsatisfactory.

When emulsions containing methyltriethoxysilane and polymethylsiloxane are used for impregnating the surfaces of building materials, the methyltriethoxysilane and the polymethylsiloxane separate, and the methyltriethoxysilane penetrates more deeply into the building materials while the polymethylsiloxane remains predominantly at the surface where it causes an undesirable sheen.

It is an object of the present invention to provide inexpensive aqueous emulsions for the water repellent impregnation of building materials, in particular structural fibre-reinforced cement components, which do not yellow under the influence of light and air and which show a good impregnating effect without causing any sheen at the surface of the building materials.

This object is achieved by the present invention by providing aqueous emulsions of (A) an organopolysiloxane which is free of basic nitrogen and (B) an alkyltrialkoxysilane, which contain (C) an emulsifier and (D) water, wherein the organopolysiloxane (A) has the formula

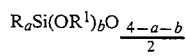

where R denotes identical or different monovalent, substituted or unsubstituted, SiC-attached $C_1$–$C_{18}$-hydrocarbon radicals, $R^1$ denotes identical or different monovalent $C_1$–$C_6$-hydrocarbon radicals, a is 0, 1, 2 or 3, on average from 0.75 to 1.5, and b is 1, 2 or 3, on average from 0.2 to 2.0, and has a molecular weight of at least 600 g/mol.

Although not indicated in the above-indicated formula, some of the radicals R may be replaced by hydrogen atoms bonded directly to silicon atoms. However, this is not preferred.

Preferably, the radicals R contain at the most 12 carbon atoms per radical. Examples of radicals R are alkyl radicals, such as methyl, ethyl, n-propyl, isopropyl, n-butyl, isobutyl, tert-butyl, n-pentyl, isopentyl, neopentyl, tert-pentyl, hexyl, such as n-hexyl, heptyl, such as n-heptyl, octyl, such as n-octyl and isooctyl, such as 2,2,4-trimethylpentyl, nonyl, such as n-nonyl, decyl, such as n-decyl and dodecyl, such as n-dodecyl, alkenyl radicals, such as vinyl and allyl, cycloalkyl, such as cyclopentyl, cyclohexyl, cycloheptyl and methylcyclohexyl, aryl, such as phenyl and naphthyl, alkaryl, such as o-, m- and p-tolyl, xylyl and ethylphenyl and aralkyl, such as benzyl and alpha- and β-phenylethyl.

Examples of substituted radicals R are cyanoalkyl radicals such as β-cyanoethyl, and halogenated hydrocarbon radicals, for example haloalkyl radicals, such as 3,3,3-trifluoro-n-propyl, 2,2,2,2', 2',2'-hexafluoroisopropyl and heptafluoroisopropyl, and haloaryl, such as o-, m- and p-chlorophenyl.

On account of better accessibility, preferably at least 50% of the radicals R, in particular at least 80% of the radicals R, are methyl radicals.

In the foregoing formula, a is preferably on average from 0.9 to 1.1 and b preferably from 0.8 to 1.4, in particular from 1.0 to 1.2.

It is possible to use one organopolysiloxane, preferably one of the foregoing formula, but it is also possible to use a plurality of organopolysiloxanes.

Particularly preferred organopolysiloxanes (A) are those which are obtainable by reacting methyltrichlorosilane or phenyltrichlorsilane with ethanol in water, for example those of the empirical formula.

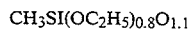

or

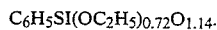

Preferably, the organopolysiloxanes (A) and hence also the organopolysiloxanes of the formula (I) have a viscosity of 15 to 2,000 mPas.s at 25° C. in particular 20 to 200 mPa.s at 25° C.

The alkyltrialkoxysilane (B) has identical or different monovalent substituted or unsubstituted SiC-attached $C_2$–$C_{15}$-alkyl radicals and preferably identical or different substituted or unsubstituted $C_1$–$C_6$-alkoxy radicals.

Preferred alkyl radicals have 4 to 10 carbon atoms, such as n-butyl, sec-butyl, isobutyl, tert-butyl, n-pentyl, isopentyl, neopentyl, tert-pentyl, hexyl, such as n-hexyl, heptyl, such as n-heptyl, octyl, such as n-octyl and isooctyl, such as 2,2,4-trimethylpentyl, nonyl, such as n-nonyl, decyl, such as n-decyl, cycloalkyl, such as cyclopentyl, cyclohexyl and cycloheptyl and methylcyclohexyl.

The substituted alkyl radicals are cyanoalkyl radicals, such as β-cyanoethyl, and haloalkyl radicals, such as 3,3,3-trifluoro-n-propyl, 2,2,2,2',2',2'-hexafluoroisopropyl and heptafluoroisopropyl.

Preferred alkoxy radicals of the alkyltrialkoxysilane have 1 to 4 carbon atoms, such as methoxy, ethoxy, n-propoxy, isopropoxy, n-butoxy, isobutoxy, sec-butoxy and tert-butoxy, of which methoxy and ethoxy are particularly preferred.

The alkoxy radicals of the alkyltrialkoxysilane may be, substituted by cyano and halogen. It is possible to use one alkyltrialkoxysilane but it is also possible to use mixtures of a plurality of alkyltrialkoxysilanes.

The aqueous emulsions according to the present invention contain an emulsifier known per se.

Suitable anionic emulsifiers are in particular:

1. Alkyl sulphates, in particular those having a chain length of 8 to 18 carbon atoms, alkyl and alkyl ether sulphates having 8 to 18 carbon atoms in the hydrophobic moiety and 1 to 40 ethylene oxide (EO) or propylene (PO) units.
2. Sulphonates, in particular alkanesulphonates of 8 to 18 carbon atoms, alkylarenesulphonates of 8 to 18 carbon atoms, taurides, esters and monoesters of sulphosuccinic acid with monohydric alcohols or alkylphenols of 4 to 15 carbon atoms; optionally, these alcohols or alkylphenols may also have been ethoxylated with 1 to 40 EO units.
3. Alkali and ammonium salts of carboxylic acids having 8 to 20 carbon atoms in the alkyl, aryl, alkaryl or aralkyl radical.
4. Partial phosphoric esters and alkali and ammonium salts thereof, in particular alkyl and alkaryl phosphates having 8 to 20 carbon atoms in the organic moiety, alkyl ether and alkaryl ether phosphates having 8 to 20 carbon atoms in the alkyl or alkaryl moiety and 1 to 40 EO units.

Suitable nonionic emulsifiers are in particular:

5. Polyvinyl alcohol with a degree of polymerisation of 500 to 3,000 which still contains 5 to 50%, preferably 8 to 20%, of vinyl acetate units.
6. Alkyl polyglycol ethers, preferably those having 8 to 40 EO units and alkyl radicals of 8 to 20 carbon atoms.
7. Alkylaryl polyglycol ethers, preferably those having 8 to 40 EO units and 8 to 20 carbon atoms in the alkyl and aryl radicals.
8. Ethylene oxide/propylene oxide (EO/PO) block copolymers, preferably those having 8 to 40 EO or PO units.
9. Fatty acids of 6 to 24 carbon atoms.
10. Natural substances and derivatives thereof, such as lecithin, lanolin, saponins, cellulose; cellulose alkyl ethers and carboxyalkylcelluloses with alkyl groups each having up to 4 carbon atoms.
11. Linear organo(poly)siloxanes which contain polar groups, in particular those with alkoxy groups having up to 24 carbon atoms and/or up to 40 EO and/or PO groups.

Suitable cationic emulsifiers are in particular:

12. Salts of primary, secondary and tertiary fatty amines of 8 to 24 carbon atoms with acetic acid, sulphuric acid, hydrochloric acid and phosphoric acids.
13. Quaternary alkylammonium and alkylbenzeneammonium salts, in particular those whose alkyl group has 6 to 24 carbon atoms, in particular the halides, sulphates phosphates and acetates.
14. Alkylpyridinium, alkylimidazolinium and alkyloxazolinium salts, in particular those whose alkyl chain has up to 18 carbon atoms, specifically the halides, sulphates, phosphates and acetates.

Suitable ampholytic emulsifiers are in particular:

15. Amino acids with long chain substituents, such as N-alkyldi(aminoethyl)glycine or N-alkyl-2-aminopropionic acid salts.
16. Betaines, such as N-(3-acylamidopropyl)-N:N-dimethylammonium salts having one $C_8$–$C_{18}$-acyl radical and alkylimidazolium betaines.

The nonionic emulsifiers are preferred, in particular the polyvinyl alcohol listed above under 5. Particularly preferred polyvinyl alcohols still contain 10 to 15% of vinyl acetate units and have a degree of polymerisation of 1,200 to 2,000.

The aqueous emulsions according to the present invention contain 30 to 95%, preferably 35 to 70% by weight, in particular 45 to 60% by weight, of water.

In the emulsions according to the present invention, the weight ratio of (A) organopolysiloxane and (B) alkyltrialkoxysilane is from 100:1 to 1:1, preferably from 24:1 to 1:1, particularly preferably from 10:1 to 2:1, in particular from 5:1 to 3:1.

The proportion of emulsifier (C) can be 0.1 to 15% by weight of the total amount of (A) organopolysiloxane and (B) alkyltrialkoxysilane. Preferably, it is 2 to 10% by weight.

The emulsions according to the present invention may additionally contain customary fillers and thickeners, in particular reinforcing fillers, i.e. fillers having a BET surface area of more than 50 m$^2$/g, such as pyrogenic silica, precipitated silica and silicon-aluminium mixed oxides with a large BET surface area. It is particularly advantageous to use finely divided silica. It is possible to use one kind of filler, but it is also possible to use a mixture of at least two fillers.

The emulsions according to the present invention may also contain buffer substances which stabilise the pH within the range from 4 to 7, within which the alkyltrialkoxysilanes are very hydrolysis-resistant. It is possible to use any organic or inorganic acid or base which is chemically inert to the other constituents of the emulsions according to the present invention, in particular the alkali metal, alkaline earth metal and ammonium salts of carboxylic acids, phosphoric acid, carbonic acid and sulphuric acid. Particular preference is given to sodium carbonate, sodium bicarbonate, sodium hydrogenphosphate, sodium acetate and a mixture of acetic acid and aqueous ammonia solution. The preferred amount of buffer substances is between 0.01 and 4% by weight.

The emulsions according to the present invention, in addition to the above-described ingredients, may contain additives comprising fungicides, bactericides, algicides, microbicides, scents, corrosion inhibitors, defoamers and, although not preferred, organic solvents. The emulsions according to the present invention preferably contain each additive in an amount of 0.001 to 1% by weight, in particular 0.01 to 0.1% by weight.

The amounts specified herein for fillers, thickeners, buffer substances and additives are each based on the sum total of the weights of (A) organopolysiloxane, (B) alkyltrialkoxysilane, (C) emulsifier and (D) water.

The present invention also provides a process for preparing an aqueous emulsion of (A) organopolysiloxane which is free of basic nitrogen and (B) alkyltrialkoxysilane, containing (C) an emulsifier and (D) water, wherein the organopolysiloxane (A) has the formula

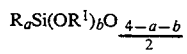

where R denotes identical or different monovalent, substituted or unsubstituted, SiC-attached $C_1$–$C_{18}$-hydrocarbon radicals, $R^1$ denotes identical or different monovalent $C_1$–$C_6$-hydrocarbon radicals, a is 0, 1, 2 or 3, on average from 0.75 to 1.5, and b is 1, 2 or 3, on average from 0.2 to 2.0, and has a molecular weight of at least 600 g/mol, and wherein initially only some of the water is emulsified with (A) the organopolysiloxane, (B) the alkyltrialkoxysilane and (C) the emulsifier and subsequently the remaining water is emulsified in.

The aqueous emulsions according to the present invention can be prepared by conventional methods for preparing aqueous emulsions. Preferably, initially only some of the water is emulsified with (A) the organopolysiloxane, (B) the alkyltrialkoxysilane and (C) the emulsifier, until a viscous oil phase is formed, and subsequently the remaining water is emulsified again to form a less viscous emulsion. The organopolysiloxane can also be desorbed in the alkyltrialkoxysilane, so that the two components are added simultaneously to the emulsion formed from emulsifier and water.

The emulsifying can be carried out batchwise in an emulsifying range or preferably continuously in a flow-through mixing range.

The emulsions are preferably prepared at 0° to 50° C., in particular at 20° C., and preferably at pressures of 0.5 to 2 MPa (absolute), in particular at 0.1 MPa (absolute).

The emulsions according to the present invention are suitable for the water-repellent impregnation of building materials, such as natural or man-made stone, aerated and non-aerated concrete, cement and masonry.

The emulsions are particularly suitable for the water-repellent impregnation of structural fibre-reinforced cement components where the fibres are natural or synthetic fibres. Suitable natural fibres are mineral fibres, such as rock wool, quartz or ceramic fibres, or vegetable fibres, such as cellulose, suitable synthetic fibres are for example glass fibres, polymer fibres and carbon fibres.

Particular preference is given to using the emulsion according to the present invention for impregnating structural components of cement reinforced with cellulose fibre. The cellulose fibres can be for example jute, coconut or hemp fibres or come from paper, cardboard or paper waste.

The emulsions according to the present invention are suitable for application in the mass, i.e. the emulsion is added to the hydraulic mixture for making structural components prior to setting, or for impregnating structural components after setting.

The emulsions according to the present invention can be diluted with water before being used as water repellents and impregnants. For the surface impregnation of building materials after setting it is advantageous to dilute to a total content of (A) organopolysiloxane and (B) alkyltrialkoxysilane of 1% by weight.

In the examples which follow,
a) all the quantities stated are by weight,
b) all the pressures are 0.1 MPa (absolute), and
c) all the temperatures 20° C.,
unless otherwise stated.

EXAMPLES

Preparation of organopolysiloxane (A):

The organopolysiloxane (A) used in the examples which follow was a monomethylsiloxane having ethyl groups attached to silicon via oxygen, and it was prepared as follows:

A mixture of 10 mol of ethanol and 5.5 mol of water was added dropwise from a dropping funnel to a mixture of 6 mol of methyltrichlorosilane and 400 g of toluene with stirring and gaseous hydrogen chloride evolved and the contents of the reaction vessel, initially at 30° C., cooled off rapidly. On completion of the addition of the ethanol-water mixture, the reaction mixture was heated to 40° C. and a mixture of ethanol, water and hydrogen chloride was distilled off at 0.20 kPa (absolute). The remaining hydrogen chloride was neutralised with anhydrous sodium carbonate, and then remaining ethanol and water were distilled off at 0.30 kPa (absolute) at up to 120° C. the temperature of the liquid flask contents. The distillation residue was cooled off and filtered to leave a clear, colourless liquid having a viscosity of 20 mPa.s at 23° C. It has the empirical formula

$CH_3Si(OC_2H_5)_{0.8}O_{1.1}$.

This organopolysiloxane has a molecular weight of 650 g/mol.

Example

Preparation of emulsion according to the invention:

A Turrax emulsifier was used to emulsify 20.25 parts by weight of water with 2.25 parts by weight of polyvinyl alcohol having a degree of polymerisation of about 1,600 and still containing 11–14% of acetoxyethylene units (Polyviol W 25/140 from Wacker-Chemie, Munich) at 1,000 rpm. Then 38 parts by weight of the above-prepared organopolysiloxane (A), 10 parts by weight of isooctyltrimethoxysilane (VP 1316 from Wacker-Chemie, Munich) and 2 parts by weight of highly divided silica having a BET surface area of 120 m²/g (Wacker HDK H 15° from Wacker-Chemie GmbH, Munich) were emulsified in the stated order at 15,000 rpm. The result was the formation of a viscous oil phase, which became more fluid in the course of the subsequent emulsification with a further 27.5 parts by weight of water. The total time for the emulsifying was 10 min. The emulsion obtained was finally mixed with 0.1 part by weight of a 20% by weight sodium acetate solution and 0.05 part by weight of a fungicide.

Preparation of emulsion not according to the invention

The same method was used to prepare an emulsion using instead of 10 parts by weight of isooctyltrimethoxysilane a further 10 parts by weight of the organopolysiloxane (A). This emulsion thus contained 48 parts by weight of the organopolysiloxane (A).

USE EXAMPLE

Preparation of structural fibre-reinforced cement components as test specimens:

10 parts by weight of paper towels (from Papierhygiene GmbH, Heidelberg) were shredded and mixed with 56 parts by weight of water. The moist paper mass was stored for 24 hours, then homogenised with a dissolver, admixed with 5 parts by weight of finely granular quartz sand, 75 parts by weight of Portland cement 45F, 10 parts by weight of calcium carbonate and optionally water repellent, and intensively mixed once more. The fibre-cement mass was then put into a filter press and was pressed off over a steel sieve with a pressure ram under a water jet vacuum. The moist press cake, 9.5 cm in diameter and 1.5 cm in thickness, was stored at 50% relative humidity for 6 days to set.

The amount of water repellent added was calculated in % by weight of the total amount of cement, fibre, sand and calcium carbonate. The amount of water repellent added was 0, 1 or 5% by weight. The water repellents used were:

1. Above-described emulsion according to the invention containing 38% by weight of organopolysiloxane and 10% by weight of alkyltrialkoxysilane 2. Above-described emulsion not according to the invention containing 48% by weight of organopolysiloxane
3. No water repellent After the storage period was over, some test specimens, which had been prepared without water repellent, were immersed in impregnating solution for 5 minutes and then stored for 5 days. The impregnating solution used was a dilution of the above-described water repellent with water in a ratio of 1:8 or 1:15. The surfaces of the test specimens retained their matt appearance.

Water pressure test according to DIN 18180:

The test specimens were stored in a waterbath at room temperature for 60 or 120 min. The water column above the test specimen surface was 50 mm. The water uptake was determined gravimetrically and expressed as % by weight.

The results of the water pressure test following water repellency treatment through addition of the water repellent in the mass are listed in Table I.

TABLE I

| Water repellency treatment through addition in the mass | | | |
|---|---|---|---|
| Water repellent | amount in % by weight | Water uptake in % by weight | |
| | | after 60 min | after 120 min |
| 1 | 1 | 4.7 | 5.6 |
| | 5 | 1.4 | 1.9 |
| 2 | 1 | 9.7 | 15.5 |
| | 5 | 1.8 | 2.4 |
| 3 | — | 26.2 | 26.5 |

The results of the water pressure test following impregnation through the immersion in a diluted emulsion as water repellent are listed in Table II.

TABLE II

| | Impregnation through immersion | | |
|---|---|---|---|
| Water repellent | Dilution with water | Water uptake in % by weight | |
| | | after 60 min | after 120 min |
| 1 | 1:8 | 1.7 | 1.8 |
| | 1:15 | 1.4 | 2.4 |
| 2 | 1:8 | 1.4 | 2.6 |
| | 1:15 | 1.8 | 3.7 |
| 3 | — | 26.2 | 26.5 |

We claim:

1. A process for imparting water-repellency to structural components of cement reinforced with cellulosic fiber, consisting essentially of impregnating the cement reinforced with cellulosic fiber after setting with an aqueous emulsion containing (A) an organopolysiloxane which is free of basic nitrogen,
(B) an alkyltrialkoxysilane,
(C) polyvinyl alcohol which contains 8% to 20% vinyl acetate units and has a degree of polymerization of from 500 to 3000 and
(D) water, in which the organopolysiloxane (A) has the formula

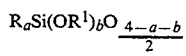

where

R is a monovalent substituted SiC-bonded $C_1$ to $C_{18}$ hydrocarbon radical, optionally substituted with cyanoalkyl radicals and/or halogenated hydrocarbon radicals, $R^1$ is a monovalent $C_1$ to $C_6$-hydrocarbon radical, a is 0, 1, 2 or 3, with an average of from 0.75 to 1.5, and b is 1, 2 or 3, with an average of from 0.2 to 2.0, and has a molecular weight of at least 600 g/mol.

2. A process for imparting water-repellency to structural components of cement reinforced with cellulosic fiber, consisting essentially of adding an aqueous emulsion containing (A) an organopolysiloxane which is free of basic nitrogen,
(B) an alkyltrialkoxysilane,
(C) polyvinyl alcohol which contains 8% to 20% vinyl acetate units and has a degree of polymerization of from 500 to 3000 and
(D) water, in which the organopolysiloxane (A) has the formula

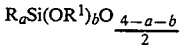

where

R is a monovalent substituted SiC-bonded $C_1$ to $C_{18}$ hydrocarbon radical, optionally substituted with cyanoalkyl radicals and/or halogenated hydrocarbon radicals, $R^1$ is a monovalent $C_1$ to $C_6$-hydrocarbon radical, a is 0, 1, 2 or 3, with an average of from 0.75 to 1.5, and b is 1, 2 or 3, with an average of from 0.2 to 2.0, and has a molecular weight of at least 600 g/mol, to the cement prior to setting.

* * * * *